(12) United States Patent
Stuart et al.

(10) Patent No.: US 10,387,525 B2
(45) Date of Patent: Aug. 20, 2019

(54) METHOD AND SYSTEM FOR INCREASING DATA RELIABILITY THROUGH CROWD SOURCING

(71) Applicant: IMS HEALTH INCORPORATED, Danbury, CT (US)

(72) Inventors: Andrew Stuart, Rydal, PA (US); Thomas Kaminski, Lawrenceville, NJ (US); John O'Connell, Princeton Junction, NJ (US)

(73) Assignee: IQVIA INC., Parsippany, NJ (US)

( * ) Notice: Subject to any disclaimer, the term of this patent is extended or adjusted under 35 U.S.C. 154(b) by 573 days.

(21) Appl. No.: 14/134,135

(22) Filed: Dec. 19, 2013

(65) Prior Publication Data

US 2014/0172835 A1 Jun. 19, 2014

Related U.S. Application Data

(60) Provisional application No. 61/739,290, filed on Dec. 19, 2012.

(51) Int. Cl.
| | |
|---|---|
| *G06F 17/00* | (2019.01) |
| *G06F 16/958* | (2019.01) |
| *G06F 16/84* | (2019.01) |
| *G06F 16/335* | (2019.01) |
| *G06F 16/435* | (2019.01) |
| *G06F 16/487* | (2019.01) |

(52) U.S. Cl.
CPC .......... *G06F 16/958* (2019.01); *G06F 16/335* (2019.01); *G06F 16/435* (2019.01); *G06F 16/487* (2019.01); *G06F 16/84* (2019.01)

(58) Field of Classification Search
CPC .......... G06F 17/3089; G06F 17/30041; G06F 17/30029; G06F 17/30699; G06F 17/30914
See application file for complete search history.

(56) References Cited

U.S. PATENT DOCUMENTS

| 6,950,821 | B2 | 9/2005 | Faybishenko et al. |
| 2002/0042923 | A1 | 4/2002 | Asmussen et al. |
| 2003/0195889 | A1* | 10/2003 | Yao .................. G06F 17/30539 |
| 2004/0122792 | A1 | 6/2004 | Salazar |
| 2005/0160108 | A1* | 7/2005 | Charlet ............. G06F 17/30595 |
| 2006/0004726 | A1* | 1/2006 | Blank ............... G06F 17/30286 709/246 |

(Continued)

*Primary Examiner* — Paul Kim
(74) *Attorney, Agent, or Firm* — John Maldjian; Maldjian Law Group LLC (57) ABSTRACT

A method and system for improving aggregated data sets through crowd sourcing. The method includes organizing a plurality of data sets into an aggregated data set, providing search access to at least a portion of the aggregated data set based upon a subscription level associated with a user, and returning results to the user. Organizing the plurality of data sets into an aggregated data set includes receiving data from a plurality of sources, parsing the data, translating the parsed data into its native format and content, tagging the parsed data with attributes detailing how the data is entered, wherein the attributes comprise geographic location information, and mapping the translated data into a plurality of database tables within the aggregated data set. The system includes various components for performing the method.

14 Claims, 5 Drawing Sheets

(56) References Cited

U.S. PATENT DOCUMENTS

| | | |
|---|---|---|
| 2006/0156031 A1 | 7/2006 | Sturms et al. |
| 2009/0106207 A1 | 4/2009 | Solheim et al. |
| 2009/0282010 A1* | 11/2009 | Vasudevan ........ G06F 17/30734 |
| 2010/0030737 A1 | 2/2010 | Scheuber-Heinz et al. |
| 2011/0173214 A1* | 7/2011 | Karim ................. G06F 17/3002 |
| | | 707/754 |
| 2012/0054172 A1* | 3/2012 | Agrawal ................. H04W 4/18 |
| | | 707/713 |
| 2012/0323884 A1* | 12/2012 | Draese .............. G06F 17/30424 |
| | | 707/713 |
| 2013/0110876 A1 | 5/2013 | Meijer et al. |
| 2014/0172834 A1 | 6/2014 | Stuart et al. |

* cited by examiner

METHOD AND SYSTEM FOR INCREASING DATA RELIABILITY THROUGH CROWD SOURCING

CROSS REFERENCE TO RELATED APPLICATION

This application claims the priority benefit of U.S. Provisional Application No. 61/739,290 entitled "Improving Data Reliability Through Crowd Sourcing" and filed Dec. 19, 2012, the content of which is hereby incorporated by reference in its entirety.

FIELD OF THE INVENTION

This invention generally relates to improving the reliability of data, and more particularly, to improving the reliability of data through crowd sourcing.

BACKGROUND OF THE INVENTION

Recently, access to shared data sets via data communications such as the Internet has increased greatly, providing access to this information to many people and organizations. For example, a collection of national provider identification (NPI) numbers is stored in the NPI database, which provides access to many individuals and organizations for verification of healthcare related information. For example, the NPI database may be used to: validate healthcare related correspondence; coordinate benefits between health plans; identify potential health care providers; verify healthcare providers on prescription information; and other related functions.

One drawback to shared data sets is the reliability of the data. Typically, when data is available for free, the data is of reasonable quality. However, the data is largely incomplete and may require multiple sources to verify the information. Conversely, commercially provided data typically has a high associated cost and is of questionable and varying quality. Additionally, data provided by multiple providers is typically in widely varying formats and is not easily imported into a single data set.

Varied reliability is especially common when reviewing health care provider/health care organization (HCP/HCO) information. As multiple providers sell, license, or otherwise provide access to the data, updates to the data provided by a first provider does not necessarily get reflected in another provider's data set. Thus, an individual or organization looking for reliable and updated information may have to access multiple providers, increasing the overall cost to the individual or organization.

SUMMARY

The present disclosure concerns methods and systems for improving aggregated data sets through receiving and verifying data from multiple sources or subscribers during creation and updating of the aggregated data set. For example, in one scenario, a method of improving aggregated data sets through crowd sourcing includes organizing a plurality of data sets into an aggregated data set, providing search access to at least a portion of the aggregated data set based upon a subscription level associated with a user, and returning results to the user. Organizing the plurality of data sets into an aggregated data set includes receiving data from a plurality of sources, parsing the data, translating the parsed data into its native format and content, tagging the parsed data with attributes detailing how the data is entered, wherein the attributes comprise geographic location information, and mapping the translated data into a plurality of database tables within the aggregated data set.

In an alternative scenario, a system for improving aggregated data sets through crowd sourcing includes a non-transitory computer readable medium configured to store an aggregated data set and a processing device operably connected to the non-transitory computer readable medium. The processing device is configured to organize a plurality of data sets into an aggregated data set, provide searching access to at least a portion of the aggregated data set based upon a subscription level associated with a user, and return results to the user. Organizing the plurality of data sets into an aggregated data set includes receiving data from a plurality of sources, parsing the data, translating the parsed data into its native format and content, tagging the parsed data with attributes detailing how the data is entered, wherein the attributes comprise geographic location information, and mapping the translated data into a plurality of database tables within the aggregated data set.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout the specification may, but do not necessarily, refer to the same embodiment.

Furthermore, the described features, advantages and characteristics of the disclosure may be combined in any suitable manner in one or more embodiments. One skilled in the relevant art will recognize, in light of the description herein, that the teachings of the disclosure made herein can be practiced without one or more of the specific features or advantages of a particular embodiment. In other instances, additional features and advantages may be recognized in certain embodiments that may not be present in all embodiments of the disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Reference throughout this specification to "one embodiment", "an embodiment", or similar language means that a particular feature, structure, or characteristic described in connection with the indicated embodiment is included in at least one embodiment of the present disclosure. Thus, the phrases "in one embodiment", "in an embodiment", and similar language throughout this specification may, but do not necessarily, all refer to the same embodiment.

An embodiment of the present invention advantageously provides for aggregating data from multiple customers (including individuals and organizations), public sources (e.g., state and federal government agencies), and commercial sources into a single database to enhance the quality and validity of the data through the concept of "crowd sourcing," while increasing the convenience of customers accessing the data. As the number of subscribers to the database increases, the quality and the accuracy of the database also increase.

As used herein, a subscriber refers to an organization or individual that contributes their privately collected data (customer master) on organizations and individuals (entities), and is licensed to use the database for their own purposes of referencing all those entities within the database as contributed/provided by all subscribers.

Figure 1:
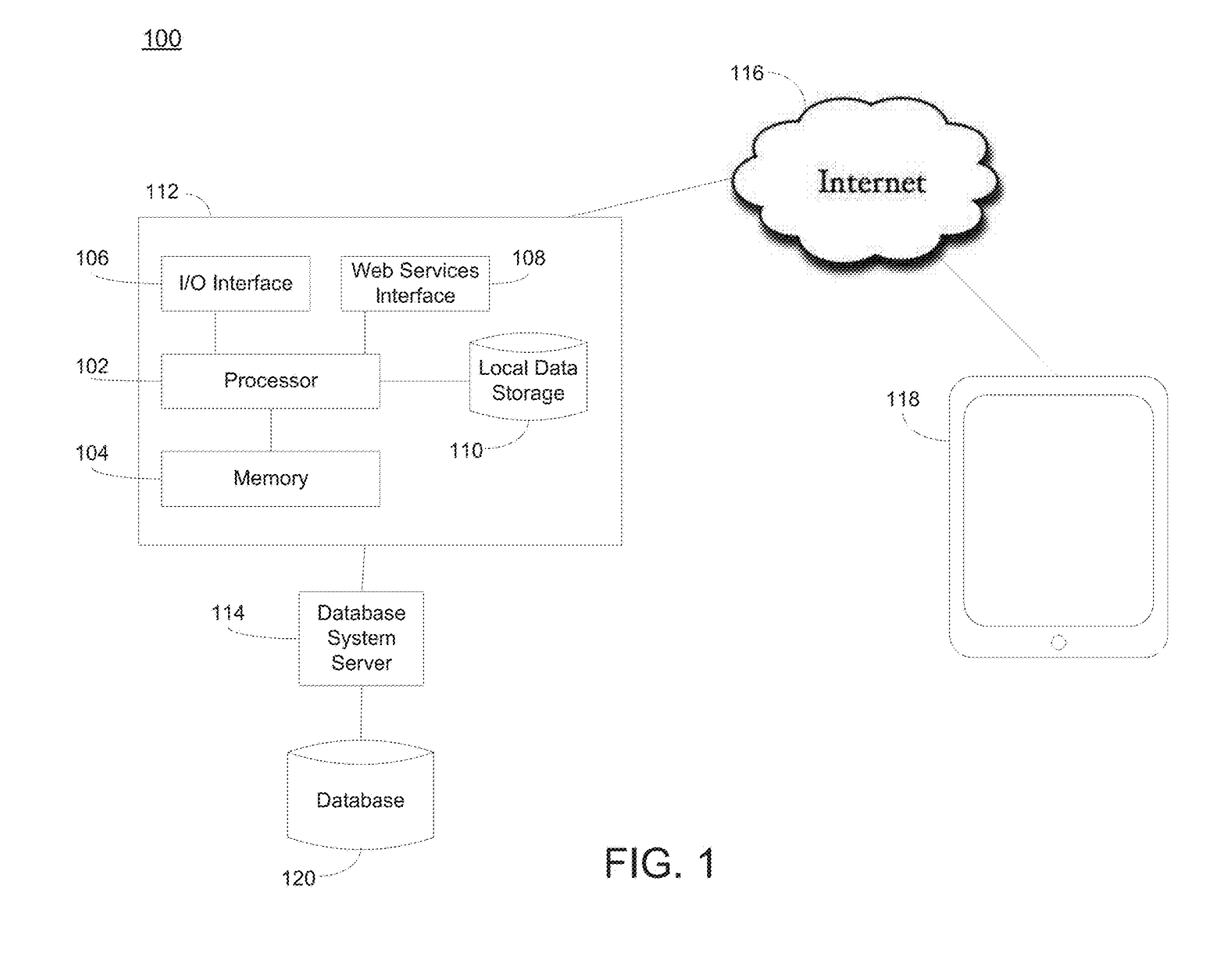
FIG. 1 depicts a block diagram depicting a network used for accessing a data set stored on a central database according to an embodiment.

FIG. 1 is a block diagram depicting exemplary components of a system 100 employing the present invention. A web application platform such as a Microsoft SharePoint® Server 112 providing Microsoft SharePoint® Services may be operably connected to a database system server 114. The SharePoint® Server may include a computer processor 102, associated computer memory 104, input/output interface 106, a web services interface 108 and local data storage 110. Either or both of the SharePoint® server 112 and the database system server 114 may include a computer memory configured with processor instructions and data which, when loaded into the processor, cause the processor to execute the methods of the invention. Either or both of the SharePoint® server 112 and the database system server 114 may alternatively include several processors with associated computer memory, as is well understood in the art.

The SharePoint server 112 may further be operably connected to a communication network such as the Internet 116 via the I/O interface 106 and the web services interface 108, although alternatives to the Internet are envisioned, and even a stand-alone system may alternatively be deployed. A customer computing device such as tablet computer 118 may be operably connected to the SharePoint® server 112 via the Internet 116. It should be noted that the tablet computer 118 is shown in FIG. 1 by way of example only, and additional computing devices such as a desktop computer, a notebook computer, a netbook computer, a smartphone, and other similar computing devices may be used to access the server 112.

The I/O interface 106 may be the interface with which a human user of the system interacts, presented as a graphical user interface on the tablet computer and constructed by the SharePoint® Server 112 as defined by a custom configuration by a software provider or management company. The web services interface 108 may be the computer interface through which the user's computing device (e.g., the tablet computer 118) interacts directly with the SharePoint® server 112. Specifically, an application on the tablet computer 118 may be configured to connect to the SharePoint® server 112 via the web services interface 108 to access necessary back-end services running on the SharePoint® server 112.

The SharePoint® server 112 as illustrated in FIG. 1 may be configured to run a specific application such as the RADS® system designed by R-Squared Services and Solutions, Inc. and described in application Ser. Nos. 12/699,398 and 12/952,296.

The database system server 114 may further include, or be operably connected to, a database 120. The database 120 may incorporate the crowd sourcing techniques described above, and described in more detail below.

An example of a database 120 may be the $CIR^2US$® database designed by R-Squared Services and Solutions, Inc., for greater flexibility in storing HCP/HCO data. In summary, there is a master record that is used to aggregate a number of elements comprised of name, address, identifier, affiliation and professional details data. Multiple sources, such as the subscribers as discussed above, may contribute data elements to the aggregate such that the primary data constructed from a public source may be enlarged with specific client data. The flexible nature of the tables used to store the data may also contains keys to keep track of the elements contributed from single sources such that they may be updated in a manner similar to a single record containing the HCP/HCO data.

The data elements may be database normalized with auxiliary tables that constrain the types and sources to preset data. The data elements may be preprocessed such that components of the data are stored and are readily available. For example, in the case of addresses, the address may be geocoded and parsed into elements (number, pre-directional, street, suffix, post-directional, secondary-unit, and secondary-number). These components may be used on an item by item basis to match records using a chi-squared statistic target function. The location and address elements may then used to calculate the probability that two records are the same or strongly linked. The data may be stored with permissions such that public data, client private data and licensed data may be housed together, but upon retrieval the data is filtered based on the subscriber's permissions, thereby ensuring the security of restricted or private data.

The name, address and identifier data may be treated as separate components for the search system build to provide fast approximate string searches. The database may support individual component searches as well as general searches in which the union of orthogonal searches is scored, ordered and returned to a requesting application. This is a unique approach for the database as well as searching as the typical approach is to have the name, address, identifier information in a single record that, by the nature of the table, limits the number of elements that may be grouped and/or aggregated together. An example of such is the NPI data base that uses a single key (NPI Number) to store a fixed number of elements tightly linked. Associations between records or additions (noting source, time, and permissions) are not allowed in such a design. Since the components are separated into different tables and preprocessed with additional computational based information, the data is readily available for loading and searching in the database as taught herein. Like above, access permissions for the elements are controlled by the subscriber's permission in conjunction with the data type permissions. In this way, contributed license data as well as privileged firm data may be stored securely and accessed as a single data set.

For searching the database, an approximate string searching system may utilize string metric functions (e.g., edit distance norm/Levenstein, Jaccard, Dice and other similar functions) for comparisons to indexed data in an inverted list data structure to afford O(N log N) search times on large (more than ten million string elements). The searching system may be parallelized to facilitate the search in which the data is first partitioned into sizes suitable based on the number of processors available on the machine. The system may separate the search and extraction subsystems such that search results may be supplemented with additional data and secondary searches can be constructed from preliminary results. The results may be scored using a Chi-Squared functional form utilizing the query elements on a pair-wise comparison. The confidence of the match may then have a robust statistic (chi-squared probability based on degrees of freedom) to measure the confidence in the match which in general will be comprised of elements of names, addresses and identifiers.

The CIR$^2$US® database as described herein is provided by way of example only. The data aggregation and crowd sourcing techniques as discussed herein may be applied to any database or data structure including data sets accessible by subscribers via public or private access.

Within the database, each entity may have a key master record that identifies and describes the entity, along with child records as contributed by each subscriber and source that further identifies various names, addresses, license data, credentials, specialties, and affiliations that are associated with the entity. As the number of subscribers and sources to the database increases, the quality and accuracy of the data may also increases. While any one subscriber's data may be questionable for a specific entity, the presence of the exact same data for that entity as provided by one or more other subscribers and sources may validate the accuracy of the data. In other words, the process validates the quality of the data through public input.

Figure 2:
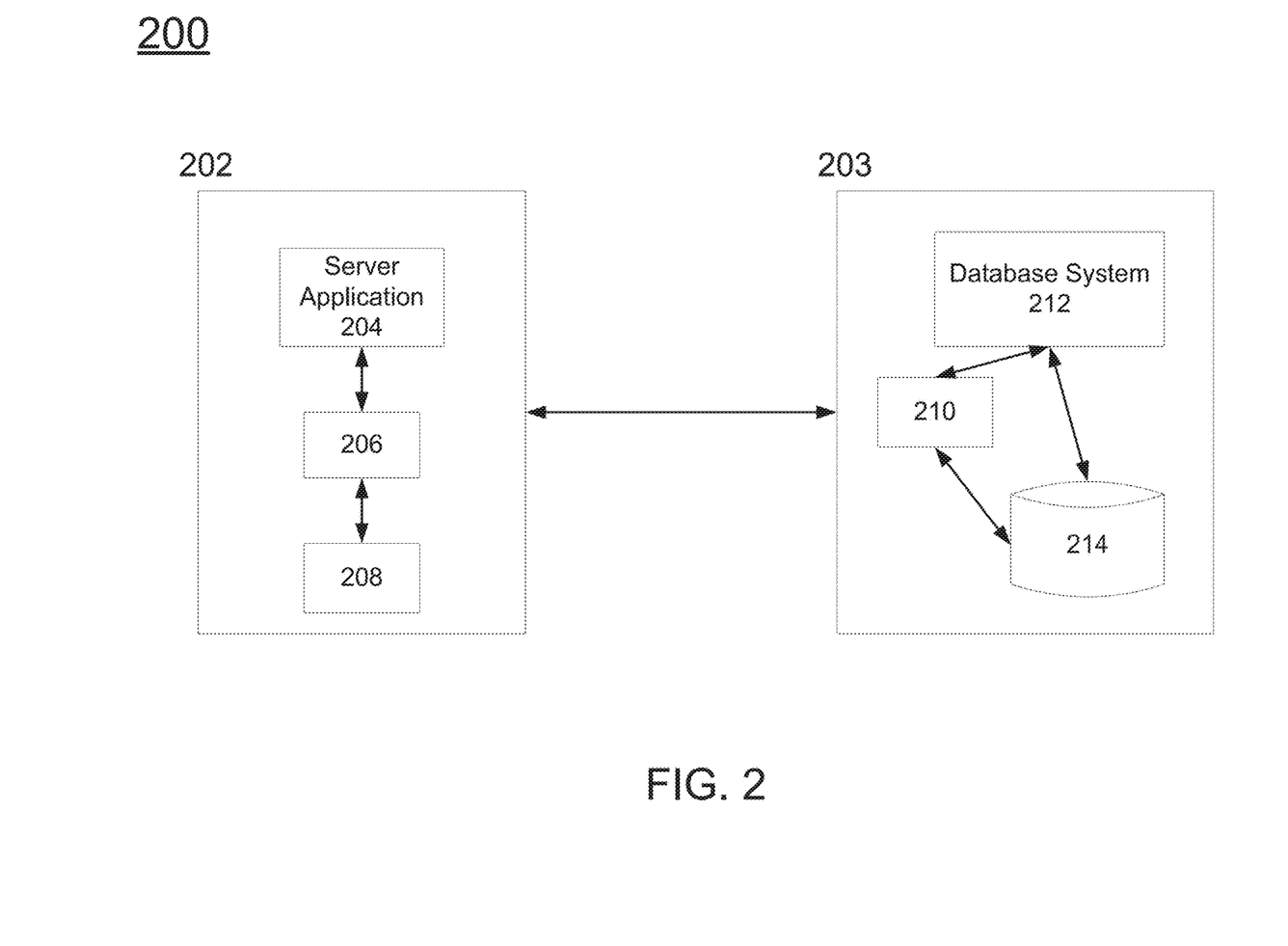
FIG. 2 depicts a block diagram of a customer computing device accessing a crowd sourced database according to an embodiment.

FIG. 2 illustrates a block diagram of a system 200, the system including a server 202 (e.g., SharePoint® server 112 as shown in FIG. 1) accessing a database system 203 including a crowd sourced database 214. A customer computing device, including a client application, may be operably connected to the server 202, instructing the server to establish a connection with the database system 202. The server 202 may initiate an instance of a server-side application 204 configured to establish an operable connection to and communication with the database system 203. It should be noted that while a direct connection is shown in FIG. 2 between the server 202 and the database system 203, this is shown by way of example only. A direct connection (e.g., via a local intranet) or an indirect connection (e.g., the connection as shown in FIG. 1 via Internet 116) maybe used.

The server-side application 204 may access a local instance of a database application programming interface (API) 206. For example, if the database 214 is a CIR$^2$US® database as described above, the server-side application 204 may access a local instance of a CIR$^2$US® API. Via the local instance of the database API 206, the server-side application 204 may access a local instance of the database search service 208. The local instance of the database search service 208 may have limited functionality and be configured to provide limited services such as general search (e.g., name, address, identifier searching) as well as access to a client's data.

In addition to the database 214, the database system 203 may include an instance of the database API 210 as well as a database search application 212. The database search application 212 may include additional functionality not available to the local instance of the database search service, such as access to master, inclusion and licensed data. In order to access this information, the client computing device 202 may require various credentials or authorization which is verified by the database search application prior to returning any private or licensed information.

The identity of each subscriber (i.e., each user of a client computing device operably connected to server 202) may be masked to other subscribers within the database so as to maintain the privacy of each subscriber, only the details of each entity are shared or used for validation. Other subscribers can see various levels of entity detail based on their subscription level, but cannot see which other subscriber(s) has provided the data.

Figure 3:
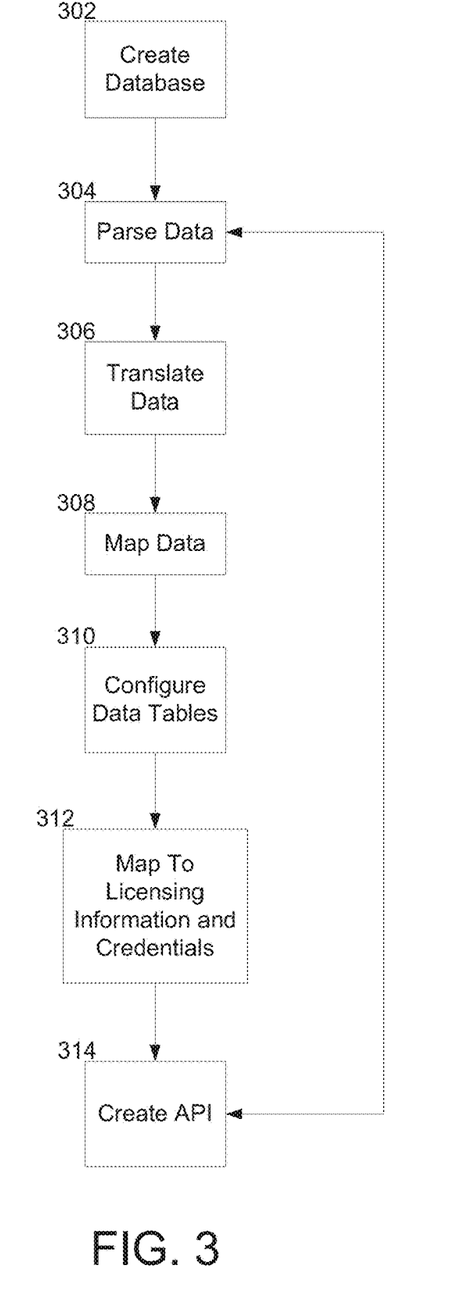
FIG. 3 depicts a flow chart of an example procedure for updating a database according to an embodiment.

FIG. 3 illustrates an example of a process for creating and updating the data stored within a database such as database 214. Initially, the database may be created 302 to create each entity stored within the database. Each entity may have a master record that identifies and describes the entity, along with child records as contributed by each subscriber and source that further identifies various names, license data, credentials, specialties, and affiliations that are associated with the entity. The database may be created 302 as a combination of public available information as well as information available from private sources.

Data provided by a subscriber, or received from a private or public data set, may be parsed 304 so that the data can be translated 306 into its native format and content. The translated data may then be mapped 308 into a proper database table and/or field.

Each of the data tables may be configured 310 to identify one or more premium data sources for accessing the data stored therein, as well as mapped 312 to licensing information and credentials for each customer/user in the system. As a user becomes licensed or subscribes to particular content, the mapping 312 information may be updated to reflect the changes, thereby providing the user with the appropriate access. In particular, the database may be configured to recognize a user with a set of credentials along with a subscription level that is capable of relating what level or subscription data a customer is licensed for. Similarly, the data tables may include this security and licensing information such that, when a user connects to the database, only the data for which they are subscribed is available. Search results may be filtered or otherwise examined such that only appropriate data is delivered to a subscriber.

Various web services such as a database API may be created 314 for one or more subscribers, the APIs configured to provide customers access to the data from the customers' computing devices.

The process as shown in steps 304-314 may be repeated for each data source or subscriber. As each source is included in the database, the data is aggregated to improve the reliability of the data, thus increasing the ease of implementation of the database while maintaining a high level of data reliance.

When data is entered into the system by a subscriber, it is tagged with attributes as to how the data is entered, for example, by form based input or by GPS location. Geo tagging the data may also help to increase the accuracy and validity of the data as it confirms an actual location for the entity.

A subscriber may choose to participate at a private data level, whereby all of their data remains completely private and its presence is unknown to other subscribers in the system. A private subscriber may not see any data from any other subscriber and only has access to their data plus public data provided by the database system.

Figure 4:
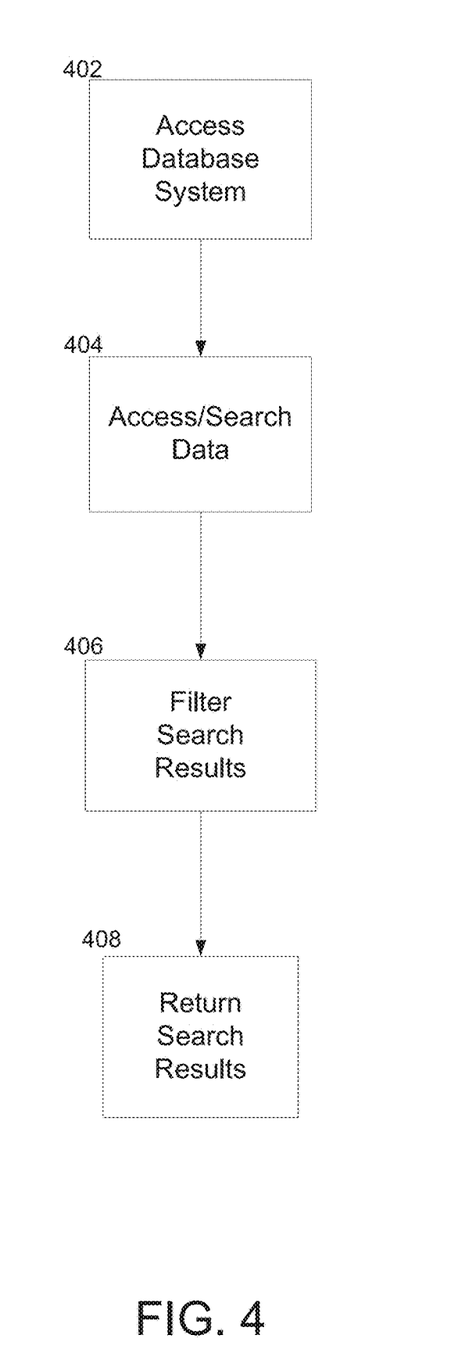
FIG. 4 depicts a flow chart of an example procedure for accessing a database according to an embodiment.

FIG. 4 depicts a flow chart of an example procedure for accessing and searching a database by a customer. A customer's specific access to the data contained within the database is dependent upon the type of data licensed by the customer, along with their subscription level, i.e., private or public. The customer may access 402 the database system (for example, via server 202 as shown in FIG. 2) using their login credentials, e.g., a username and password combination. The database system verifies the customer's login credentials and, if correct, provides the customer access 402 to the system.

To initially access 402 the system, the user may obtain a license to at least a portion of the data as well as the associated security credentials. Once a customer has a license, a database deployment or development team may update or otherwise configure to the database with the proper credentials and enable the customer's subscriptions such that the customer can access the data they have licensed via a client application configured to connect to an instance of the database API. For example, if a customer licenses access to the CIR$^2$US® database as discussed above, the customer's RADS® application may update to provide the customer access to their licensed data. The customer may then user their RADS® application to access the database.

After accessing 402 the database system, the customer may access and/or search 404 the data. The system may return and filter 406 the customer's search results according to the license and credentials associated with the customer. For example, the customer may have a private or public license. If the customer has a public credential, the database system may filter 406 the search results such that the customer receives a set of universal/public data. If the customer has a private credential, the database system may filter 406 the search results such that the customer receives their own private data. Additionally, the customer may receive licensed data if the customer has purchased or otherwise enabled the license for that data. Similarly, certain customer logins may be associated with firm private data.

After the data is filtered 406 appropriately for the requesting customer, the search results may be returned 408 to the customer for review.

Figure 5:
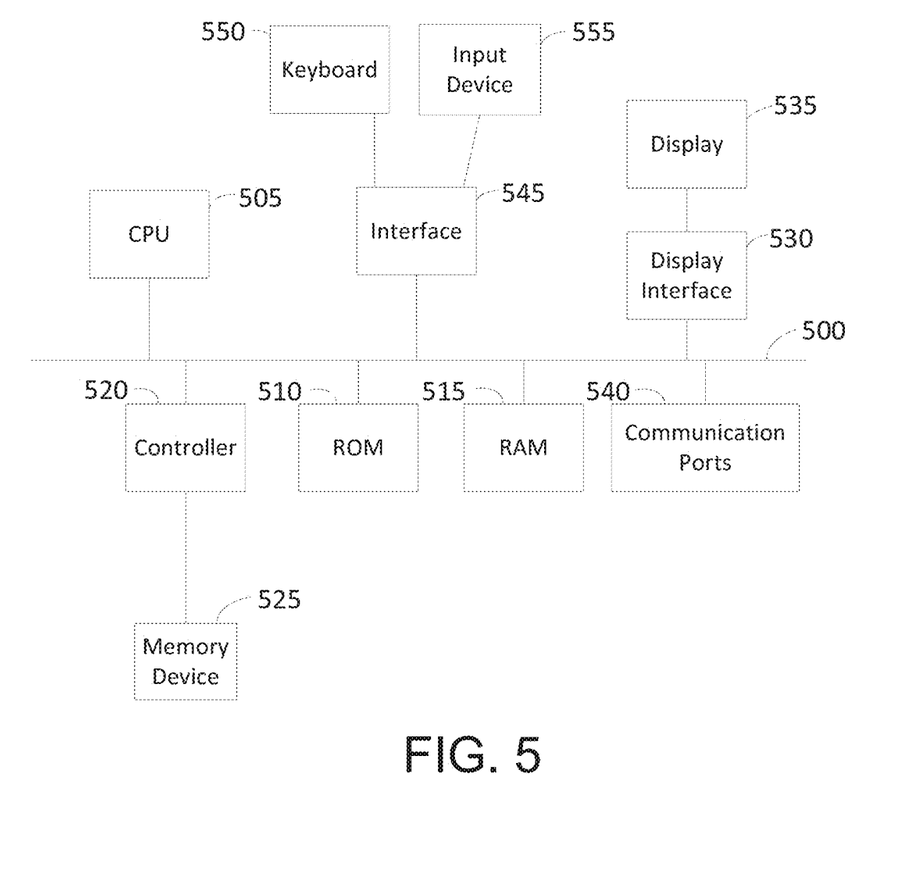
FIG. 5 depicts various embodiments of a computing device for implementing the various methods and processes described herein.

FIG. 5 depicts a block diagram of internal hardware that may be used to contain or implement the various computer processes and systems as discussed above. An electrical bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is a processing device, computing device or processor as such terms are used within this disclosure. Read only memory (ROM) 510 and random access memory (RAM) 515 constitute examples of memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices. Additionally, the memory devices 525 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, a distributed computer storage platform such as a cloud-based architecture, and/or other recording medium.

An optional display interface 530 may permit information from the bus 500 to be displayed on the display 535 in audio, visual, graphic or alphanumeric format. Communication with external devices may occur using various communication ports 540. A communication port 540 may be attached to a communications network, such as the Internet or a local area network.

The hardware may also include an interface 545 which allows for receipt of data from input devices such as a keyboard 550 or other input device 555 such as a mouse, a joystick, a touch screen, a remote control, a pointing device, a video input device and/or an audio input device.

The present invention as discussed herein provides a single source data provider having a homogenized and blended data set created from data obtained from all providers and sources so as to be accessible in a common format and content while maintaining a high level of reliability. Flexible, source independent data tables and data structures, along with a powerful search engine that examines all data as a single data source for presentation to a customer, results in powerful and efficient flexible searching.

It should be noted the above examples and disclosure is directed to healthcare related data by way of example only and the ideas taught herein may be applied to any data sets. For example, data sets related to transportation, law, sports, and other similar topics may benefit from the aggregation and crowd sourcing techniques as taught herein to improve the reliability of the data.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of improving aggregated data sets through crowd sourcing, the method comprising steps of:
 organizing, by a processing device, a plurality of data sets into a plurality of database tables of an aggregated data set, wherein each database table comprises a key master record corresponding to an entity and a plurality of child records including data corresponding to the entity, wherein the organizing comprises:

receiving data from a plurality of sources of the plurality of data sets;

parsing the data into one or more elements;

translating the one or more elements into its native format and content;

determining that the data received from at least two of the plurality of sources corresponds to a single entity;

determining that the data received from the at least two sources includes values of at least one common attribute of the single entity;

validating accuracy of the data received from the at least two sources if the respective values of the at least one common attribute of the single entity are identical to each other, wherein the at least two sources comprise at least one public source and at least one premium source;

tagging the data with attributes detailing how the data received from the plurality of sources was entered, wherein the attributes comprise geographic location information; and mapping the translated one or more elements into the plurality of database tables within the aggregated data set, wherein mapping comprises updating the plurality of child records with the translated one or more elements; and providing search access to at least a portion of the aggregated data set based upon a subscription level associated with a user.

2. The method of claim 1, wherein providing searching access further comprises:

receiving a search query from the user to search the aggregated data;

determining which portions of the aggregated data set the user can access based upon the subscription level of the user;

filtering a set of search results based upon the determination of which portions of the aggregated data set the user can access; and returning the filtered search results to the user.

3. The method of claim 2, wherein determining which portions of the aggregated data set the user can access further comprises:

determining whether the user has a public credential; and if the user has a public credential, returning a universal set of public data extracted from the aggregated data set.

4. The method of claim 3, wherein determining which portions of the aggregated data set the user can access further comprises:

determining whether the user has a private credential; and if the user has a private credential, returning a private set of data extracted from the aggregated data set, wherein the private set of data is accessible only by the user.

5. The method of claim 1, further comprising:

identifying one or more premium data sources for the data contained within the aggregated data set; and mapping each of the plurality of database tables to licensing information for each identified premium data source.

6. The method of claim 1, further comprising verifying authenticity of the received data based upon at least the geographic location information.

7. The method of claim 6, wherein verifying the authenticity of the received data comprises at least one of comparing similar data already stored in the aggregated data set, confirming one or more of the attribute tags of the received data, and confirming geo-tagging information associated with the received data.

8. A system for improving aggregated data sets through crowd sourcing, the system comprising:

a non-transitory computer readable medium configured to store an aggregated and one or more instructions; and a processing device operably connected to the non-transitory computer readable medium and, in response to execution of the one or more instructions, is configured to:

organize a plurality of data sets into a plurality of database tables of an aggregated data set, wherein each database table comprises a key master record corresponding to an entity and a plurality of child records including data corresponding to the entity, wherein the organizing comprises:

receiving data from a plurality of sources of the plurality of data sets;

parsing the data into one or more elements;

translating the one or more elements into its native format and content;

determining that the data received from at least two of the plurality of sources corresponds to a single entity;

determining that the data received from the at least two sources include values of at least one common attribute of the single entity;

validating accuracy of the data received from the at least two sources if the respective values of the at least one common attribute of the single entity are identical to each other, wherein the at least two sources comprise at least one public source and at least one premium source;

tagging the data with attributes detailing how the data received from the plurality of sources was entered, wherein the attributes comprise geographic location information; and mapping the translated one or more elements into the plurality of database tables within the aggregated data set, wherein mapping comprises updating the plurality of child records with the translated one or more elements; and provide search access to at least a portion of the aggregated data set based upon a subscription level associated with a user.

9. The system of claim 8, wherein the one or more instructions for causing the processing device to provide searching access further comprise one or more instructions that, when executed, cause the processing device to:

receive a search query from the user to search the aggregated data;

determine which portions of the aggregated data set the user can access based upon the subscription level of the user;

filter a set of search results based upon the determination of which portions of the aggregated data set the user can access; and return the filtered search results to the user.

10. The system of claim 9, wherein the one or more instructions for causing the processing device to determine which portions of the aggregated data set the user can access further comprise one or more instructions that, when executed, cause the processing device to:

determine whether the user has a public credential; and if the user has a public credential, return a universal set of public data extracted from the aggregated data set.

11. The system of claim 10, wherein the one or more instructions for causing the processing device to determine which portions of the aggregated data set the user can access further comprise one or more instructions that, when executed, cause the processing device to:
  determine whether the user has a private credential; and
  if the user has a private credential, return a private set of data extracted from the aggregated data set, wherein the private set of data is accessible only by the user.

12. The system of claim 8, further comprising one or more instructions that, when executed, cause the processing device to:
  identify one or more premium data sources for the data contained within the aggregated data set; and
  map each of the plurality of database tables to licensing information for each identified premium data source.

13. The system of claim 8, further comprising one or more instructions that, when executed, cause the processing device to verify authenticity of the received data based upon at least the geographic location information.

14. The system of claim 13, wherein the one or more instructions for causing the processing device to verify the authenticity of the received data further comprise one or more instructions that, when executed, cause the processing device to perform at least one of comparing similar data already stored in the aggregated data set, confirming one or more of the attribute tags of the received data, and confirming geo-tagging information associated with the received data.

* * * * *